(12) United States Patent
Fukaya et al.

(10) Patent No.: US 8,882,280 B2
(45) Date of Patent: Nov. 11, 2014

(54) OPTICAL SUBSTRATE

(71) Applicant: Kabushiki Kaisha Topcon, Tokyo (JP)

(72) Inventors: Hiroki Fukaya, Tokyo (JP); Youichi Shimamura, Tokyo (JP); Takuro Okubo, Tokyo (JP); Saki Odaka, Tokyo (JP); Takaaki Saito, Tokyo (JP); Tatsuya Kojima, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 13/647,875

(22) Filed: Oct. 9, 2012

(65) Prior Publication Data

US 2013/0271836 A1    Oct. 17, 2013

(30) Foreign Application Priority Data

Jan. 31, 2012 (JP) ................... 2012-018267

(51) Int. Cl.
| | | |
|---|---|---|
| B60R 1/06 | (2006.01) | |
| G02B 1/11 | (2006.01) | |
| G02B 27/00 | (2006.01) | |
| G02B 1/10 | (2006.01) | |
| G02B 5/28 | (2006.01) | |
| C03C 17/34 | (2006.01) | |

(52) U.S. Cl.
CPC *G02B 1/11* (2013.01); *G02B 1/115* (2013.01); *G02B 1/105* (2013.01); *G02B 5/285* (2013.01); *G02B 27/0006* (2013.01); *C03C 17/34* (2013.01)
USPC ............................ 359/507; 359/588; 359/586

(58) Field of Classification Search
CPC .................. G02B 27/0006; G02B 1/11–1/118
USPC .................................. 359/586, 588
See application file for complete search history.

(56) References Cited

U.S. PATENT DOCUMENTS

| | | | |
|---|---|---|---|
| 2001/0021446 A1* | 9/2001 | Takematsu et al. | 428/220 |
| 2005/0181146 A1* | 8/2005 | Yoneyama et al. | 428/1.31 |
| 2007/0217014 A1* | 9/2007 | Fukushige | 359/582 |
| 2010/0226005 A1* | 9/2010 | Nishimoto et al. | 359/359 |

FOREIGN PATENT DOCUMENTS

| | | |
|---|---|---|
| JP | 3710721 | 8/2005 |
| JP | 4078520 B2 | 2/2008 |

\* cited by examiner

*Primary Examiner* — Alicia M Harrington
*Assistant Examiner* — Marin Pichler
(74) *Attorney, Agent, or Firm* — Foley & Lardner LLP (57) ABSTRACT

An optical substrate such as a cover glass which effects only a small change in a reflected color dependent on an incident angle, or more particularly, an optical substrate such as a cover glass for displays includes a reinforcement layer intended to prevent cracking, an antiglare layer formed on the reinforcement layer, a tone-adjustment antireflection film formed on the antiglare layer, and an antifouling layer formed on the antireflection film intended to minimize fingerprint adhesion. The antireflection film includes at least nine layers.

16 Claims, 6 Drawing Sheets

OPTICAL SUBSTRATE

BACKGROUND OF THE INVENTION

1. Field of the Invention

The present invention relates to an optical substrate such as a cover glass for displays which is used for a touch panel. More particularly, the present invention is concerned with an optical substrate that has, for example, a reinforcement layer, which is intended to prevent cracking, formed on a glass substrate, has an antiglare layer such as a microstructure formed on the reinforcement layer, has a tone-adjustment antireflection film formed on the antiglare layer, and has an antifouling layer, which is intended to minimize fingerprint adhesion, formed on the antireflection film.

2. Description of Related Art

In the past, a filter with an antireflection feature for display devices which has a reinforcement layer formed by performing reinforcement treatment on a glass substrate, and has a tone-adjustment antireflection film formed on the reinforcement layer has been known.

For example, in Japanese Patent No. 4078520, as described especially in paragraphs 0039 to 0045, an oxynitride tin film of 107 nm thick is formed as a first layer directly on a glass substrate, and a silicon dioxide film of 72 nm thick is further formed as a second layer in order to thus perform reinforcement treatment on the glass. A PET-coated reflective film that has undergone tone correction is bonded to the conductive film with an acrylic adhesive between them, whereby an antireflection filter is fabricated.

In Japanese Patent No. 3710721, as described in paragraphs 0063 to 0065 and shown in FIG. 2, a functional film (C) 40 is formed on a conductive mesh layer (B) 10 with a pigment-containing translucent adhesive (D) 30 between them. The functional film (C) 40 has a near-infrared absorbent containing layer 41, a polymer film 43, and an antireflection layer 42, which is hard-coated and has antistatic and antifouling properties, stacked in that order.

Further, paragraph 0032 of Japanese Patent No. 3710721 discloses the functional translucent layer (c) preferably has any of the features of an antireflection (AR) property for suppressing outside light reflection, an antiglare (AG) property for preventing projection of a mirror image, and an antireflection and antiglare (ARAG) property including both the properties.

An existing filter with an antireflection feature cannot be employed in portable electronic equipment or portable telecommunications equipment (for example, a portable cellular phone such as a smartphone or a mobile device such as an iPad (registered trademark)) as it is. This is because since the equipment is of a portable type, the equipment receives a larger amount of incident light, which comes from outside, than electric and electronic equipment such as a television set or personal computer does. Therefore, a change in a reflected color dependent on the incident light is very large and a transmittance is insufficient.

As an antifouling film, a water-repellent and oil-repellent film is well known. For the aforesaid usage, the antifouling film has to exhibit high abrasion durability. In addition, since the antifouling film is always dustproof, measures have to be taken against dustproofness. Further, the antifouling film has to be so thin as not to affect the optical characteristics of an antireflection film. However, the antifouling film capable of satisfying these requirements simultaneously is unavailable.

SUMMARY OF THE INVENTION

An object of the present invention is to provide an optical substrate such as a cover glass which effects only a small change in a reflected color dependent on an incident angle of incident light. A second object of the present invention is to provide an optical substrate having an antireflection film that allows, for example, portable telecommunications equipment to fetch outside light efficiently at a high transmittance with reflection held low.

A solution of the present invention is as described in Claims.

According to the present invention, portable electronic equipment, portable telecommunications equipment, or the like can get the advantages of effecting only a small change in a reflected color dependent on an incident angle, having an easy-to-see screen, being almost free from adhesion of fingerprints, oil spots, dust, spittle, tears, drool, or the like, and being satisfactorily strong to and tough against action of an external force.

BRIEF DESCRIPTION OF THE DRAWINGS

Embodiments of the present invention will be described in detail based on the following figures, wherein.

DETAILED DESCRIPTION OF THE INVENTION

Examples of the present invention will be described below.

Figure 1:
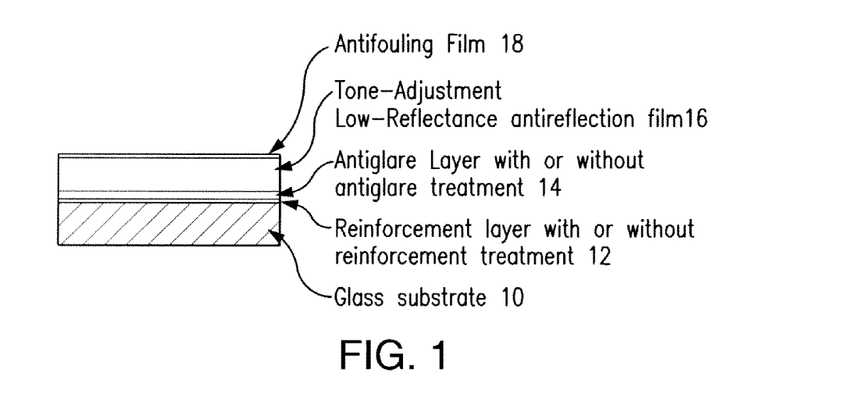
FIG. 1 is a schematic explanatory diagram showing an example of a cover glass of an optical substrate in accordance with the present invention.

As shown in FIG. 1, reinforcement treatment intended to prevent cracking is performed on a glass substrate 10 in order to form a reinforcement layer 12. The substrate is not limited to the glass substrate such as a cover glass but may be an optical substrate made of a resin or metal or formed with a film or panel, or a mixture substrate made of glass and a resin or glass and a metal.

Antiglare (AG) treatment is performed on the reinforcement layer 12 in order to form an antiglare layer 14.

On the antiglare layer 14, at least nine antireflection films are formed. For example, a reflected color adjustment low-reflectance antireflection film 16 (interference film) that includes nine layers made of $Nb_2O_5$, $SiO_2$, $Nb_2O_5$, $SiO_2$, $Nb_2O_5$, $SiO_2$, $Nb_2O_5$, $MgF_2$, and $SiO_2$ respectively, and effects only a small change in a reflected color dependent on an incident angle is formed.

A material to be made into the antireflection film 16 is a high-refractive index material ($Nb_2O_5$, $Ta_2O_5$, $TiO_2$, or ZrO$_2$), a mixture material of any of these materials, or a low-refractive index material (SiO$_2$ or MgF$_2$).

A film formation apparatus adopts a vacuum deposition method, ionization-assisted deposition (IAD) film formation method, radiofrequency (RF) ion plating film formation method, or any of various sputtering methods.

As for a reflected color, a* and b* values in the CIELAB color space meet −5<a*<5 and −5<b*<5 respectively (for example, a D65 white light source is used).

Further, anti-fingerprint adhesion (AY) film treatment is performed on the antireflection film 16 in order to form an antifouling layer 18.

For the antifouling layer 18, a silicone-series substance such as alkylsilane or a fluorine-series substance having part of protons thereof replaced by fluorine is adopted. The molecules of the substances are so small that even when the substance is coated over an antireflection film, it hardly affects the optical characteristics of the antireflection film. Since the substances readily react on moisture, that is, cause hydrolysis or silylation reaction, a coating fluid capable of preventing the reaction should be produced. A substrate to be coated is coated according to a dip coating technique or the like so that an alkyl group or fluorine group reacts on the substrate while being oriented to the surface of the substrate, whereby the substance is cohered and fixed to the substrate to be coated. Accordingly, antifouling performance is exerted to the greatest extent, and cohesion to the substrate to be coated is upgraded. Eventually, abrasion durability is improved. Electrification can be avoided by devising a combination with the material of an underlying antireflection film.

Further, if the antireflection film of the surface of the substrate to be coated is subjected to activation treatment such as plasma cleaning prior to coating, cohesion is further upgraded. Eventually, abrasion durability is drastically improved.

An antireflection film is formed on an optical surface of a substrate in order to minimize reflection of rays from an interface between the optical substrate and a medium.

The refractive index nl of a superficial layer that abuts on a medium is equal to or lower than 1.50 with respect to a design center wavelength λ0.

Preferably, the antireflection film 16 in the present invention satisfies conditions (1) to (3) below on the assumption that nh denotes a refractive index of a high-refractive index material, nl denotes a refractive index of a low-refractive index material, and Δn denotes a difference between the refractive indices nh and nl of adjoining layers.

$$nh \leq 2.0 \quad (1)$$

$$nl \leq 1.60 \quad (2)$$

$$\Delta n \geq 0.30 \quad (3)$$

The above numerical limitation is not merely derived from the results of simulation. An actual prototype has demonstrated that the numerical values realize the most suitable low reflectance at a probability of 90% or more.

Further preferably, the antireflection film 16 in the present invention satisfies conditions below on the assumption that n1, n2, n3, n4, n5, n6, n7, n8, and n9 denote the refractive indices of nine layers stacked in that order from a medium side, and d1, d2, d3, d4, d5, d6, d7, d8, and d9 denote the optical film thicknesses of the layers stacked in that order from the medium side.

$$n2 \leq 1.40 \quad (a)$$

$$n3 = n5 = n7 = n9 > n1 = n4 = n6 = n8 > n2 \quad (b)$$

$$0.0225\lambda0 \leq d1 \leq 0.0525\lambda0 \quad (c)$$

$$0.1453\lambda0 \leq d2 \leq 0.3389\lambda0 \quad (d)$$

$$0.0733\lambda0 \leq d3 \leq 0.1710\lambda0 \quad (e)$$

$$0.0307\lambda0 = d4 \leq 0.0716\lambda0 \quad (f)$$

$$0.2096\lambda0 \leq d4 \leq 0.4892\lambda0 \quad (g)$$

$$0.0315\lambda0 \leq d6 \leq 0.0735\lambda0 \quad (h)$$

$$0.0810\lambda0 \leq d7 \leq 0.1889\lambda0 \quad (i)$$

$$0.0798\lambda0 \leq d8 \leq 0.1863\lambda0 \quad (j)$$

$$0.0258\lambda0 \leq d9 \leq 0.0602\lambda0 \quad (k)$$

The above wavelength ranges are not merely derived from the results of simulation. An actual prototype has demonstrated that the wavelength ranges realize the most suitable low reflectance at a probability ranging from 80% to 95%.

Further preferably, the superficial layer and second layer of the antireflection film 16 in the present invention contain at least one material to be selected from a group including silicon oxide and magnesium fluoride.

Further preferably, the antireflection film 16 in the present invention is used for visible rays whose wavelengths range from 390 nm to 800 nm.

Further preferably, the spectral reflectance of the antireflection film 16 in the present invention is equal to or lower than 1.0% with respect to a wavelength range from 390 nm to 800 nm, and equal to or lower than 0.5% with respect to a wavelength range from 400 nm to 780 nm. The numerical limitation is also such that the most suitable low reflectance is realized at a probability of 90% or more.

Further preferably, a* and b* values in the CIELAB color space expressing the reflected color of the antireflection film 16 in the present invention meet −5<a*<5 and −5<b*<5 respectively (for example, a D65 white light source is used).

Now, examples 1 to 3 of the present invention will be described below in comparison with reference examples 1 and 2. The structures of cover glasses employed in the examples 1 to 3 and reference examples 1 and 2 are identical to that shown in FIG. 1.

EXAMPLE 1

As an optical substrate 10, for example, a glass substrate exhibiting a refractive index of 1.52 was employed.

An antireflection film 16 having nine layers as specified in Table 1 was fabricated. Reinforcement treatment intended to prevent cracking was performed on the glass substrate 10, whereby a reinforcement layer was formed.

When the number of layers was equal to or smaller than eight, a wavelength band to be covered by the antireflection film 16 was narrowed. Accordingly, a change in a reflected color dependent on an incident angle of incident light that comes from outside was increased. However, when the number of layers was nine, the change in a reflected color dependent on the incident angle was limited, and cohesion between film materials was upgraded. When the antireflection film in the example 1 was employed in portable telecommunications equipment such as a smartphone, a display section of the equipment became easy to see because it was unsusceptible to outside light and hardly glared.

The first layer of the antireflection film 16 on a medium side thereof is the superficial layer. The superficial layer was made of silicon oxide.

The film material of the second layer was magnesium fluoride, the film material of the third, fifth, seventh, and ninth layers was niobium oxide, and the film material of the fourth, sixth, and eighth layers was silicon oxide.

A design center wavelength $\lambda 0$ was 480 nm.

The first layer and the third to ninth layers on the medium side were formed by adopting an ion assisted method.

The second layer was formed using a vacuum deposition method.

More particularly, the first layer and the third to ninth layers were formed using an ion assisted apparatus in order to attain the optical film thicknesses listed in Table 1 with satisfactory reproducibility.

Further, anti-fingerprint adhesion (AY) film treatment is performed on the antireflection film 16, whereby an antifouling layer was formed.

Figure 2:
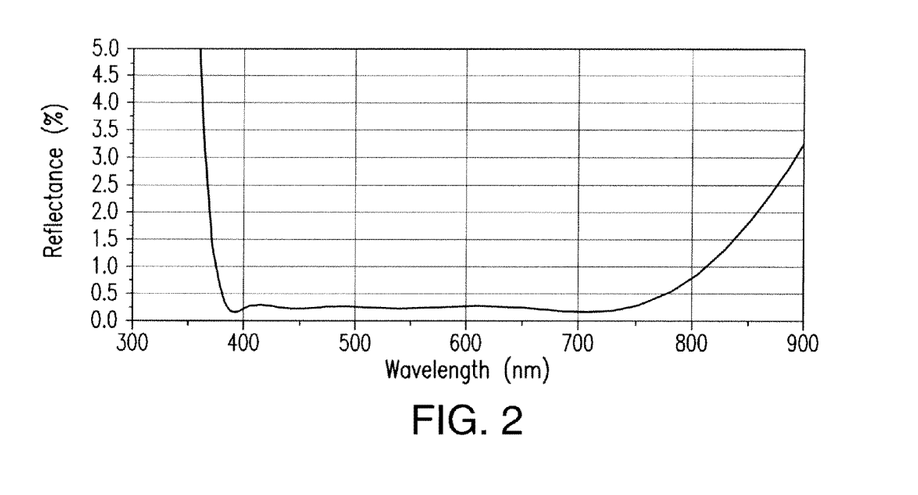
FIG. 2 is a diagram showing a spectral characteristic of an embodiment 1 of the present invention.
Figure 3:
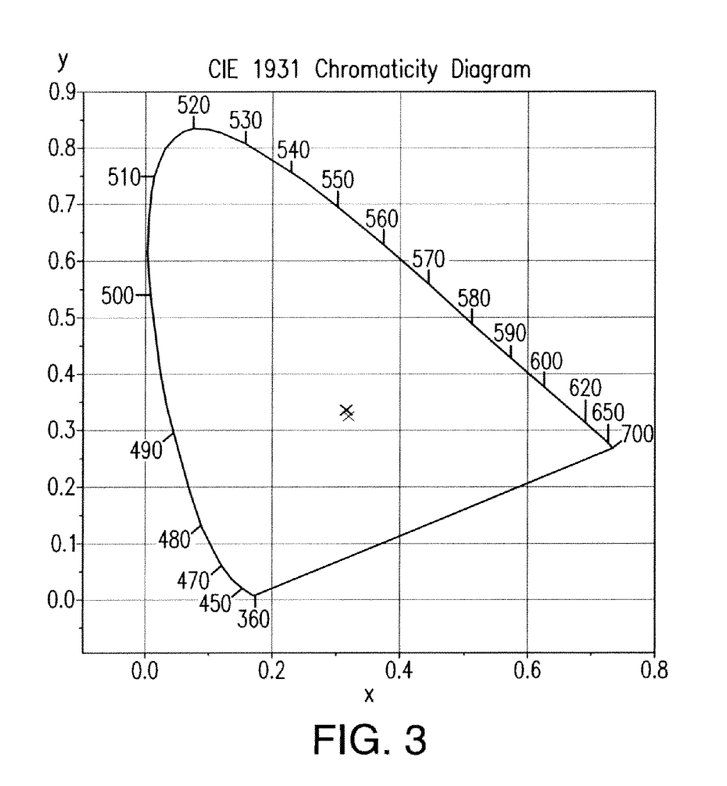
FIG. 3 is a diagram showing the reflected color of the embodiment 1 of the present invention.

The spectral characteristic and reflected color associated with the optical film thicknesses listed in Table 1 are as shown in FIG. 2 and FIG. 3.

The optical substrate is adapted to, for example, a reinforcement glass for portable telecommunications equipment.

TABLE 1

|  | Material | Refractive index | Optical film thickness |
|---|---|---|---|
| Medium | Air | 1.00 | — |
| First layer | SiO$_2$ | 1.46 | 0.0375$\lambda$0 |
| Second layer | MgF$_2$ | 1.39 | 0.2421$\lambda$0 |
| Third layer | Nb$_2$O$_5$ | 2.41 | 0.1222$\lambda$0 |
| Fourth layer | SiO$_2$ | 1.46 | 0.0511$\lambda$0 |
| Fifth layer | Nb$_2$O$_5$ | 2.41 | 0.3494$\lambda$0 |
| Sixth layer | SiO$_2$ | 1.46 | 0.0525$\lambda$0 |
| Seventh layer | Nb$_2$O$_5$ | 2.41 | 0.1349$\lambda$0 |
| Eighth layer | SiO$_2$ | 1.46 | 0.1330$\lambda$0 |
| Ninth layer | Nb$_2$O$_5$ | 2.41 | 0.0430$\lambda$0 |

EXAMPLE 2

A substrate whose surface was subjected to antiglare treatment was adopted as a glass substrate 10. Incidentally, reinforcement treatment intended to prevent cracking was performed on the glass substrate 10, whereby a reinforcement layer was formed.

An antireflection film 16 having nine layers specified in Table 2 was fabricated.

When the number of layers was equal to or smaller than eight, a wavelength band to be covered by the antireflection film was narrowed. Accordingly, a change in a reflected color dependent on an incident angle of incident light that comes from outside was increased. However, when the number of layers was nine, the change in a reflected color dependent on the incident angle was limited, and cohesion between film materials was upgraded. When the antireflection film of the example 2 was employed in portable telecommunications equipment such as a smartphone, a display section became easy to see because it was unsusceptible to outside light and hardly glared.

The first layer of the antireflection film 16 on a medium side thereof is the superficial layer. The superficial layer was made of silicon oxide.

The film material of the second layer was magnesium fluoride, the film material of the third, fifth, seventh, and ninth layers was niobium oxide, and the film material of the fourth, sixth, and eighth layers was silicon oxide.

A design center wavelength $\lambda 0$ was 480 nm.

The first layer and the third to ninth layers on the medium side were formed by adopting an ion assisted method.

The second layer was formed using a vacuum deposition method.

More particularly, the first layer and the third to ninth layers were formed using an ion assisted apparatus in order to attain the optical film thicknesses listed in Table 2 with satisfactory reproducibility.

Further, anti-fingerprint adhesion (AY) film treatment was performed on the antireflection film 16, whereby an antifouling layer was formed.

The optical substrate is adapted to a touch panel for personal computers or mobile devices or a cover glass for portable cellular phones.

Figure 4:
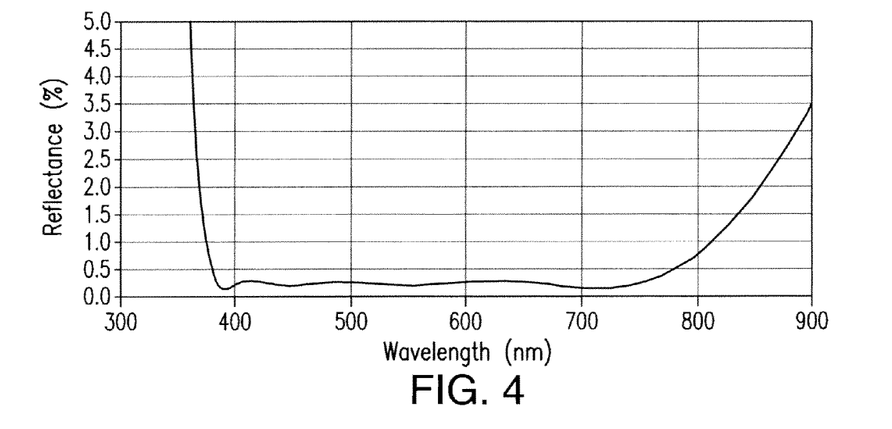
FIG. 4 is a diagram showing a spectral characteristic of an embodiment 2 of the present invention.
Figure 5:
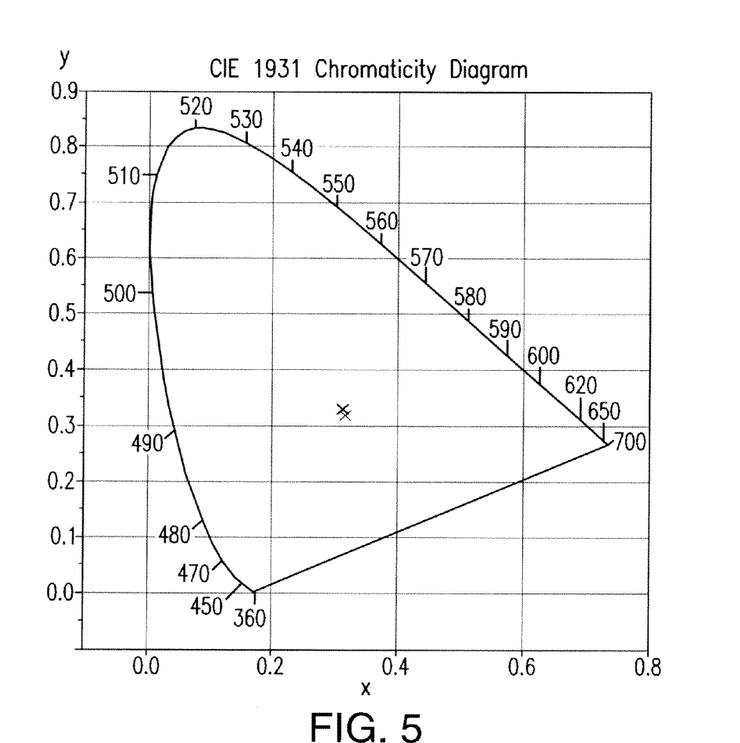
FIG. 5 is a diagram showing the reflected color of the embodiment 2 of the present invention.

The spectral characteristic and reflected color associated with the optical film thicknesses listed in Table 2 are as shown in FIG. 4 and FIG. 5.

TABLE 2

|  | Material | Refractive index | Optical film thickness |
|---|---|---|---|
| Medium | Air | 1.00 | — |
| First layer | SiO$_2$ | 1.46 | 0.0375$\lambda$0 |
| Second layer | MgF$_2$ | 1.39 | 0.2402$\lambda$0 |
| Third layer | Nb$_2$O$_5$ | 2.41 | 0.1232$\lambda$0 |
| Fourth layer | SiO$_2$ | 1.46 | 0.0487$\lambda$0 |
| Fifth layer | Nb$_2$O$_5$ | 2.41 | 0.3503$\lambda$0 |
| Sixth layer | SiO$_2$ | 1.46 | 0.0599$\lambda$0 |
| Seventh layer | Nb$_2$O$_5$ | 2.41 | 0.1177$\lambda$0 |
| Eighth layer | SiO$_2$ | 1.46 | 0.1701$\lambda$0 |
| Ninth layer | Nb$_2$O$_5$ | 2.41 | 0.0303$\lambda$0 |

EXAMPLE 3

A substrate exhibiting a refractive index of 1.52 was adopted as a glass substrate 10.

The surface of the glass substrate 10 of the present example underwent neither antiglare treatment nor reinforcement treatment intended to prevent cracking.

An antireflection film 16 having ten layers specified in Table 3 was fabricated.

When the number of layers is equal to or smaller than eight, a wavelength band to be covered by the antireflection film was narrowed. A change in a reflected color dependent on an incident angle of incident light that comes from outside was increased. However, when the number of layers is ten, the change in a reflected color dependent on the incident angle was limited, and cohesion between film materials was upgraded. When the antireflection film of the example 3 was employed in portable telecommunications equipment such as a smartphone, a display section became easy to see because it was unsusceptible to outside light and hardly glared.

The first layer of the antireflection film 16 on a medium side thereof is the superficial layer. The superficial layer was made of silicon oxide.

The film material of the second layer was magnesium fluoride, the film material of the third, fifth, seventh, and ninth layers was niobium oxide, and the film material of the fourth, sixth, eighth, and tenth layers was silicon oxide.

A design center wavelength $\lambda 0$ was 480 nm.

The first layer and the third to tenth layers on the medium side were formed by adopting an ion assisted method.

The second layer was formed using a vacuum deposition method.

More particularly, the first layer and the third to tenth layers were formed using an ion assisted apparatus in order to attain the optical film thicknesses listed in Table 3 with satisfactory reproducibility.

Further, anti-fingerprint adhesion (AY) film treatment was performed on the antireflection film 16, whereby an antifouling layer was formed.

The optical substrate is adapted to, for example, a cover glass for car navigation devices or an ordinary glass plate.

Figure 6:
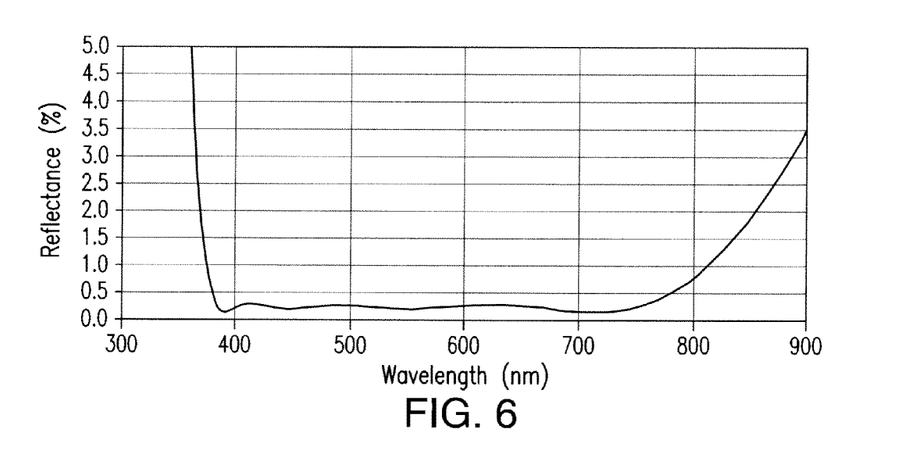
FIG. 6 is a diagram showing a spectral characteristic of an embodiment 3 of the present invention.
Figure 7:
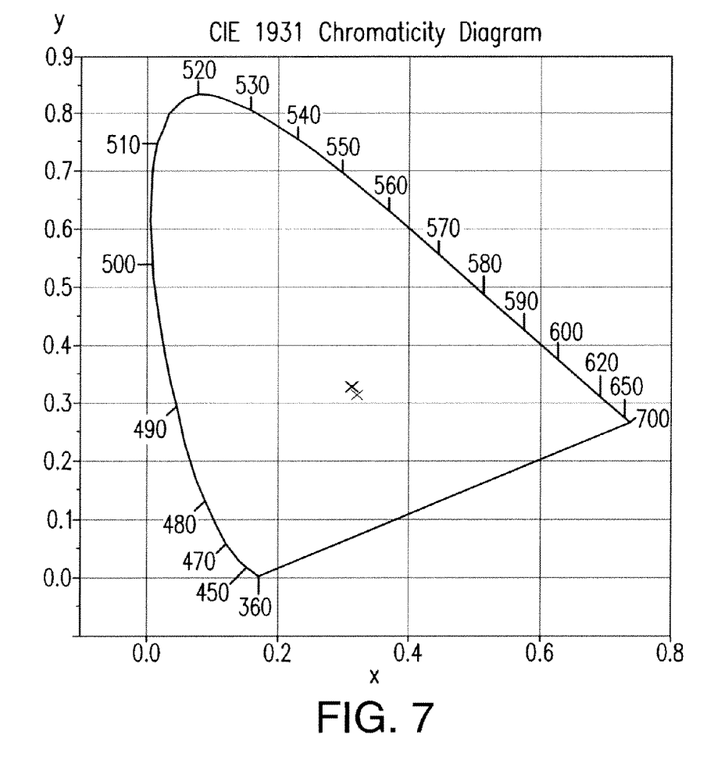
FIG. 7 is a diagram showing the reflected color of the embodiment 3 of the present invention.

The spectral characteristic and reflected color associated with the optical film thicknesses listed in Table 3 are as shown in FIG. 6 and FIG. 7.

TABLE 3

| | Material | Refractive index | Optical film thickness |
|---|---|---|---|
| Medium | Air | 1.00 | — |
| First layer | $SiO_2$ | 1.46 | $0.0375\lambda 0$ |
| Second layer | $MgF_2$ | 1.39 | $0.2419\lambda 0$ |
| Third layer | $Nb_2O_5$ | 2.41 | $0.1240\lambda 0$ |
| Fourth layer | $SiO_2$ | 1.46 | $0.0498\lambda 0$ |
| Fifth layer | $Nb_2O_5$ | 2.41 | $0.3538\lambda 0$ |
| Sixth layer | $SiO_2$ | 1.46 | $0.0579\lambda 0$ |
| Seventh layer | $Nb_2O_5$ | 2.41 | $0.1229\lambda 0$ |
| Eighth layer | $SiO_2$ | 1.46 | $0.1531\lambda 0$ |
| Ninth layer | $Nb_2O_5$ | 2.41 | $0.0452\lambda 0$ |
| Tenth layer | $SiO_2$ | 1.46 | $0.1228\lambda 0$ |

Reference Example 1

A substrate exhibiting a refractive index of 1.52 was adopted as a glass substrate 10.

An antireflection film 16 having four layers specified in Table 4 was fabricated.

Since the number of layers is four, about 60% of the most suitable reflectance is attained. Chromaticity can be satisfied. However, a wavelength band to be covered by the antireflection film 16 was narrowed, and a change in a reflected color dependent on an incident angle of incident light that comes from outside was increased.

The first layer of the antireflection film 16 on a medium side thereof is the superficial layer. The superficial layer was made of silicon oxide.

The film material of the second layer was magnesium fluoride, that of the third layer was $ZrO_2$, and that of the fourth layer was $Al_2O_3$.

A design center wavelength $\lambda 0$ was 510 nm.

The first, third, and fourth layers on the medium side were formed by adopting an ion assisted method.

The second layer was formed using a vacuum deposition method.

More particularly, the first, third, and fourth layers were formed using an ion assisted apparatus in order to attain the optical film thicknesses listed in Table 4 with satisfactory reproducibility.

Further, anti-fingerprint adhesion (AY) film treatment was performed on the antireflection film, whereby an antifouling layer was formed.

Figure 8:
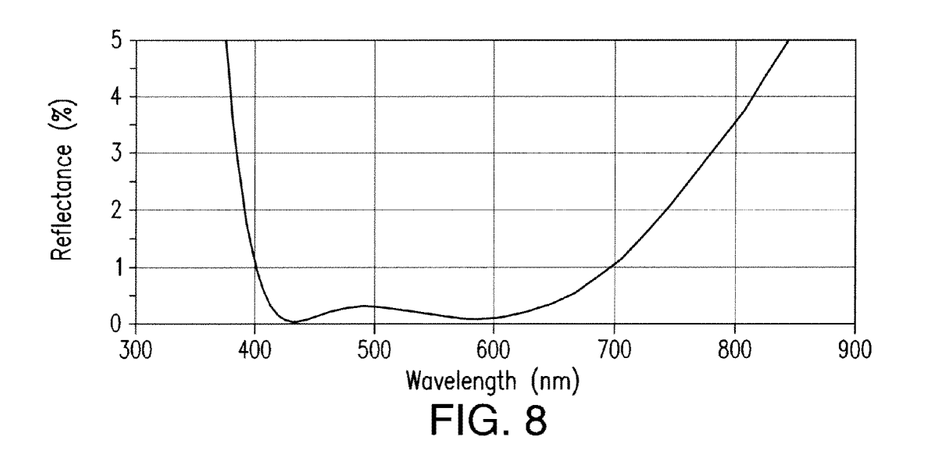
FIG. 8 is a diagram showing a spectral characteristic of a reference example (comparative example) 1.
Figure 9:
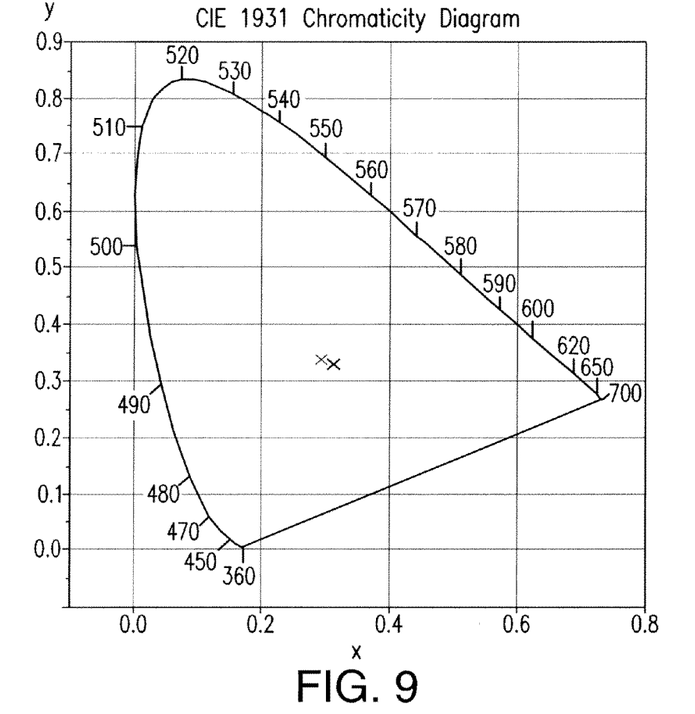
FIG. 9 is a diagram showing the reflected color of the reference example (comparative example) 1.

The spectral characteristic and reflected color associated with the optical film thicknesses listed in Table 4 are as shown in FIG. 8 and FIG. 9.

TABLE 4

| | Material | Refractive index | Optical film thickness |
|---|---|---|---|
| Medium | Air | 1.00 | — |
| First layer | $SiO_2$ | 1.46 | $0.0375\lambda 0$ |
| Second layer | $MgF_2$ | 1.38 | $0.1994\lambda 0$ |

TABLE 4-continued

| | Material | Refractive index | Optical film thickness |
|---|---|---|---|
| Third layer | $ZrO_2$ | 2.07 | $0.5068\lambda 0$ |
| Fourth layer | $Al_2O_3$ | 1.63 | $0.2763\lambda 0$ |

Reference Example 2

A substrate exhibiting a refractive index of 1.52 was adopted as a glass substrate 10.

An antireflection film 16 having six layers specified in Table 5 was fabricated.

Since the number of layers is six, about 80% of the most suitable reflectance is attained. Chromaticity can be satisfied. However, a wavelength band to be covered by the antireflection film 16 was narrowed, and a change in a reflected color dependent on an incident angle of incident light that comes from outside was increased.

The first layer of the antireflection film 16 on a medium side thereof is the superficial layer. The superficial layer was made of silicon oxide.

The film material of the second layer was magnesium fluoride, that of the third and fifth layers was $ZrO_2$, that of the fourth layer was $TiO_2$, and that of the sixth layer was $Al_2O_3$. A design center wavelength $\lambda 0$ was 510 nm.

The first layer and the third to sixth layers on the medium side were formed by adopting an ion assisted method.

The second layer was formed using a vacuum deposition method.

More particularly, the first layer and the third to sixth layers on the medium side were formed using an ion assisted apparatus in order to attain the optical film thicknesses listed in Table 5 with satisfactory reproducibility.

Further, anti-fingerprint adhesion (AY) film treatment was performed on the antireflection film, whereby an antifouling layer was formed.

Figure 10:
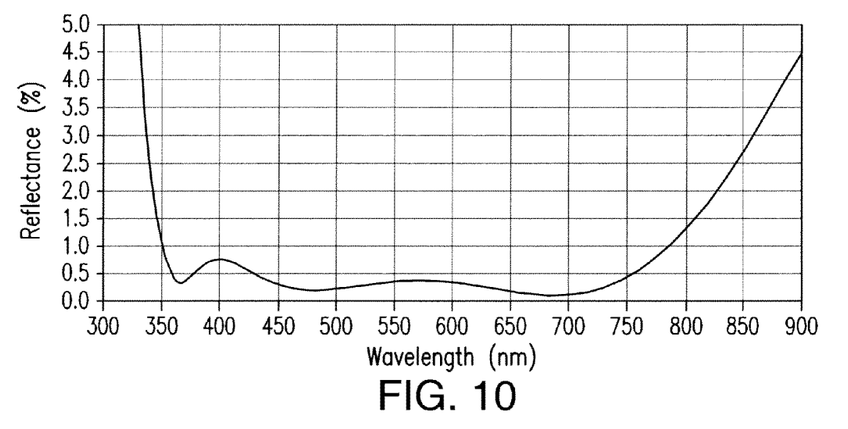
FIG. 10 is a diagram showing a spectral characteristic of a reference example (comparative example) 2.
Figure 11:
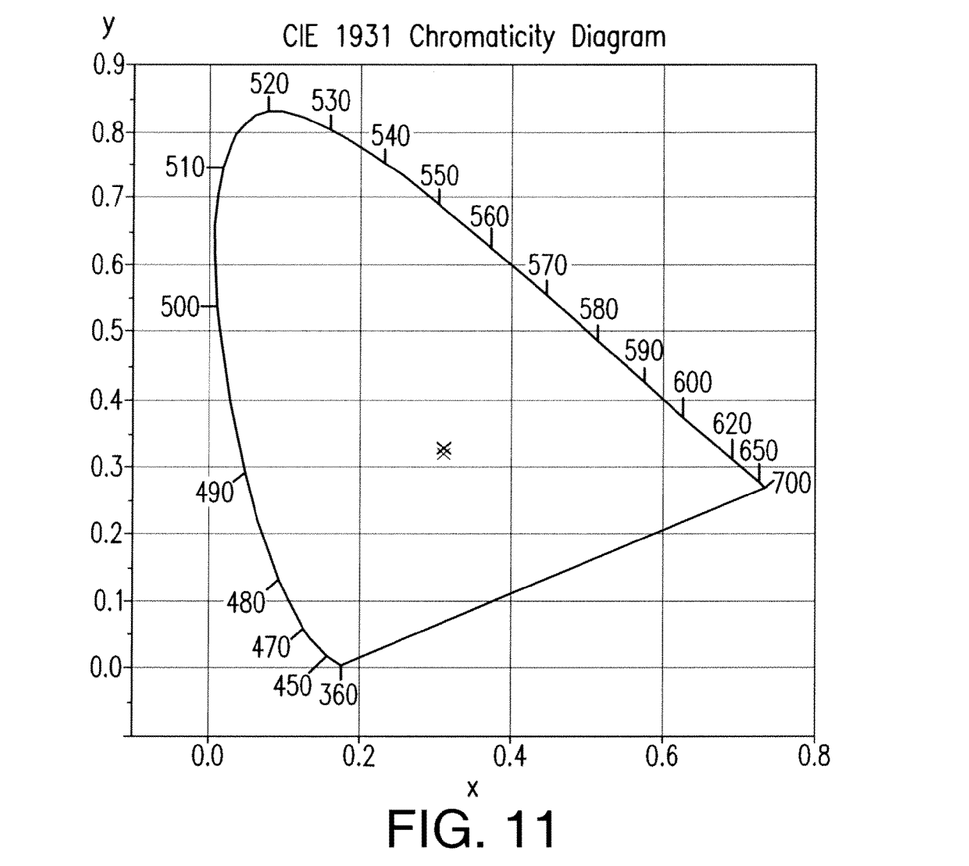
FIG. 11 is a diagram showing the reflected color of the reference example (comparative example) 2.

The spectral characteristic and reflected color associated with the optical film thicknesses listed in FIG. 5 are as shown in FIG. 10 and FIG. 11.

TABLE 5

| | Material | Refractive index | Optical film thickness |
|---|---|---|---|
| Medium | Air | 1.00 | — |
| First layer | $SiO_2$ | 1.46 | $0.0375\lambda 0$ |
| Second layer | $MgF_2$ | 1.39 | $0.2154\lambda 0$ |
| Third layer | $ZrO_2$ | 2.06 | $0.2462\lambda 0$ |
| Fourth layer | $TiO_2$ | 2.36 | $0.1597\lambda 0$ |
| Fifth layer | $ZrO_2$ | 2.06 | $0.2290\lambda 0$ |
| Sixth layer | $Al_2O_3$ | 1.63 | $0.2436\lambda 0$ |

This application claims priority from Japanese Patent Application Number 2012-018267, filed Jan. 31, 2012, which is incorporated herein by reference in its entirety.

The invention claimed is:

1. An optical substrate comprising:
   a tone-adjustment antireflection film which adjusts a reflected color and effects a small change in the reflected color depending on an incident angle; and
   an antifouling layer formed on the antireflection film in order to minimize fingerprint adhesion, wherein
   the antireflection film includes at least nine layers,
   wherein in the antireflection film a D65 white light source is used, and a* and b* values in the CIELAB color space expressing the reflected color of an antireflection film employed meet $-5 \leq a^* < 5$ and $-5 < b^* < 5$ respectively, wherein:

the antireflection film includes nine layers;

assuming that $\lambda 0$ is a design center wavelength n1, n2, n3, n4, n5, n6, n7, n8, and n9 denote the refractive indices of the nine layers at $\lambda 0$ beginning with a layer on a side of the antireflection film furthest from a reinforcement layer, and d1, d2, d3, d4, d5, d6, d7, d8, and d9 denote the optical film thicknesses of the respective layers beginning with the layer on side of the antireflection film furthest from the reinforcement layer, the antireflection film satisfies conditions below:

$$n2 \leq 1.40, \quad (a)$$

$$n3=n5=n7=n9>n1=n4=n6=n8>n2, \quad (b)$$

$$0.0225\lambda 0 \leq d1 \leq 0.0525\lambda 0, \quad (c)$$

$$0.1453\lambda 0 \leq d2 \leq 0.3389\lambda 0, \quad (d)$$

$$0.0733\lambda 0 \leq d3 \leq 0.1710\lambda 0, \quad (e)$$

$$0.0307\lambda 0 = d4 \leq 0.0716\lambda 0, \quad (f)$$

$$0.2096\lambda 0 \leq d4 \leq 0.4892\lambda 0, \quad (g)$$

$$0.0315\lambda 0 \leq d6 \leq 0.0735\lambda 0, \quad (h)$$

$$0.0810\lambda 0 \leq d7 \leq 0.1889\lambda 0, \quad (i)$$

$$0.0798\lambda 0 \leq d8 \leq 0.1863\lambda 0, \quad (j)$$

$$0.0258\lambda 0 \leq d9 \leq 0.0602\lambda 0. \quad (k)$$

2. The optical substrate according to claim 1, wherein:

the antireflection film is made of a high-refractive index material of $Nb_2O_5$, $Ta_2O_5$, $TiO_2$, or $ZrO_2$, or a mixture material using any of these materials, and a low-refractive index material of $SiO_2$ or $MgF_2$; and assuming that nh denotes the refractive index of the high-refractive index material, nl denotes the refractive index of the low-refractive index material, and $\Delta n$ denotes a difference between the refractive indices nh and nl of adjoining layers, the antireflection film satisfies conditions (1) to (3) below:

$$nh \leq 2.0, \quad (1)$$

$$nl \leq 1.60, \quad (2)$$

$$\Delta n \geq 0.30. \quad (3)$$

3. The optical substrate according to claim 1, wherein the superficial layer and second layer of the antireflection film contain at least one material selected from a group including silicon oxide and magnesium fluoride.

4. The optical substrate according to claim 1, wherein the antireflection film is used for rays whose wavelengths range from 390 nm to 800 nm.

5. The optical substrate according to claim 1, wherein the spectral reflectance of the antireflection film is equal to or lower than 1.0% with respect to a wavelength range from 390 nm to 800 nm, and equal to or lower than 0.5% with respect to a wavelength range from 400 nm to 780 nm.

6. The optical substrate according to claim 1, wherein the antifouling layer includes a water-repellent and oil-repellent film.

7. An optical substrate comprising:

a reinforcement layer intended to prevent cracking;

a tone-adjustment antireflection film formed on the reinforcement layer; and an antifouling layer formed on the antireflection film in order to minimize fingerprint adhesion, wherein the antireflection film includes at least nine layers, wherein the antireflection film adjusts a reflected color and effects a small change in the reflected color dependent on an incident angle, and wherein in the antireflection film a D65 white light source is used, and a* and b* values in the CIELAB color space expressing the reflected color of an antireflection film employed meet $-5 < a^* < 5$ and $-5 < b^* < 5$ respectively, wherein:

the antireflection film includes nine layers;

assuming that $\lambda 0$ is a design center wavelength, n1, n2, n3, n4, n5, n6, n7, n8, and n9 denote the refractive indices of the nine layers at $\lambda 0$ beginning with a layer on a side of the antireflection film furthest from a reinforcement layer, and d1, d2, d3, d4, d5, d6, d7, d8, and d9 denote the optical film thicknesses of the respective layers beginning with the layer on the side of the antireflection film furthest from the reinforcement layer, the antireflection film satisfies conditions below:

$$n2 \leq 1.40, \quad (a)$$

$$n3=n5=n7=n9>n1=n4=n6=n8>n2, \quad (b)$$

$$0.0225\lambda 0 \leq d1 \leq 0.0525\lambda 0, \quad (c)$$

$$0.1453\lambda 0 \leq d2 \leq 0.3389\lambda 0, \quad (d)$$

$$0.0733\lambda 0 \leq d3 \leq 0.1710\lambda 0, \quad (e)$$

$$0.0307\lambda 0 = d4 \leq 0.0716\lambda 0, \quad (f)$$

$$0.2096\lambda 0 \leq d4 \leq 0.4892\lambda 0, \quad (g)$$

$$0.0315\lambda 0 \leq d6 \leq 0.0735\lambda 0, \quad (h)$$

$$0.0810\lambda 0 \leq d7 \leq 0.1889\lambda 0, \quad (i)$$

$$0.0798\lambda 0 \leq d8 \leq 0.1863\lambda 0, \quad (j)$$

$$0.0258\lambda 0 \leq d9 \leq 0.0602\lambda 0. \quad (k)$$

8. The optical substrate according to claim 7, wherein:

the antireflection film is made of a high-refractive index material of $Nb_2O_5$, $Ta_2O_5$, $TiO_2$, or $ZrO_2$, or a mixture material using any of these materials, and a low-refractive index material of $SiO_2$ or $MgF_2$; and assuming that nh denotes the refractive index of the high-refractive index material, nl denotes the refractive index of the low-refractive index material, and $\Delta n$ denotes a difference between the refractive indices nh and nl of adjoining layers, the antireflection film satisfies conditions (1) to (3) below:

$$nh \leq 2.0, \quad (1)$$

$$nl \leq 1.60, \quad (2)$$

$$\Delta n \geq 0.30. \quad (3)$$

9. The optical substrate according to claim 7, wherein the superficial layer and second layer of the antireflection film contain at least one material selected from a group including silicon oxide and magnesium fluoride.

10. The optical substrate according to claim 7, wherein the antireflection film is used for rays whose wavelengths range from 390 nm to 800 nm.

11. The optical substrate according to claim 7, wherein the spectral reflectance of the antireflection film is equal to or lower than 1.0% with respect to a wavelength range from 390 nm to 800 nm, and equal to or lower than 0.5% with respect to a wavelength range from 400 nm to 780 nm.

12. An optical substrate comprising:
a reinforcement layer intended to prevent cracking;
an antiglare layer formed on the reinforcement layer;
a tone-adjustment antireflection film formed on the antiglare layer; and
an antifouling layer formed on the antireflection film in order to minimize fingerprint adhesion, wherein
the antireflection film includes at least nine layers,
wherein the antireflection film adjusts a reflected color and effects a small change in the reflected color dependent on an incident angle, and wherein in the antireflection film a D65 white light source is used, and a* and b* values in the CIELAB color space expressing the reflected color of an antireflection film employed meet $-5<a^*<5$ and $-5<b^*<5$ respectively,
wherein:
the antireflection film includes nine layers;
assuming that $\lambda 0$ is a design center wavelength, n1, n2, n3, n4, n5, n6, n7, n8, and n9 denote the refractive Indices of the nine layers at $\lambda 0$ beginning with a layer on a side of the antireflection film furthest from a reinforcement layer, and d1, d2, d3, d4, d5, d6, d7, d8 and d9 denote the optical film thicknesses of the respective layers beginning with the layer on the side of the antireflection film furthest from the reinforcement layer, the antireflection film satisfies conditions below:

$n2 \leq 1.40$, (a)

$n3=n5=n7=n9>n1=n4=n6=n8>n2$, (b)

$0.0225\lambda 0 \leq d1 \leq 0.0525\lambda 0$, (c)

$0.1453\lambda 0 \leq d2 \leq 0.3389\lambda 0$, (d)

$0.0733\lambda 0 \leq d3 \leq 0.1710\lambda 0$, (e)

$0.0307\lambda 0 = d4 \leq 0.0716\lambda 0$, (f)

$0.2096\lambda 0 \leq d4 \leq 0.4892\lambda 0$, (g)

$0.0315\lambda 0 \leq d6 \leq 0.0735\lambda 0$, (h)

$0.0810\lambda 0 \leq d7 \leq 0.1889\lambda 0$, (i)

$0.0798\lambda 0 \leq d8 \leq 0.1863\lambda 0$, (j)

$0.0258\lambda 0 \leq d9 \leq 0.0602\lambda 0$. (k)

13. The optical substrate according to claim 12, wherein:
the antireflection film is made of a high-refractive index material of $Nb_2O_5$, $Ta_2O_5$, $TiO_2$, or $ZrO_2$, or a mixture material using any of these materials, and a low-refractive index material of $SiO_2$ or $MgF_2$; and
assuming that nh denotes the refractive index of the high-refractive index material, nl denotes the refractive index of the low-refractive index material, and $\Delta n$ denotes a difference between the refractive indices nh and nl of adjoining layers, the antireflection film satisfies conditions (1) to (3) below:

$nh \leq 2.0$, (1)

$nl \leq 1.60$, (2)

$\Delta n \geq 0.30$. (3)

14. The optical substrate according to claim 12, wherein the superficial layer and second layer of the antireflection film contain at least one material selected from a group including silicon oxide and magnesium fluoride.

15. The optical substrate according to claim 12, wherein the antireflection film is used for rays whose wavelengths range from 390 nm to 800 nm.

16. The optical substrate according to claim 12, wherein the spectral reflectance of the antireflection film is equal to or lower than 1.0% with respect to a wavelength range from 390 nm to 800 nm, and equal to or lower than 0.5% with respect to a wavelength range from 400 nm to 780 nm.

* * * * *